United States Patent
Foster et al.

(10) Patent No.: US 6,799,040 B2
(45) Date of Patent: Sep. 28, 2004

(54) APPARATUS, METHOD AND SYSTEM FOR MOBILE WIRELESS COMMUNICATION HAND-OFF UTILIZING SHARED DIRECTORY NUMBERS

(75) Inventors: Eugene William Foster, Naperville, IL (US); Kimberly Sue Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 201 days.

(21) Appl. No.: 09/895,590

(22) Filed: Jun. 28, 2001

(65) Prior Publication Data

US 2003/0003911 A1 Jan. 2, 2003

(51) Int. Cl.[7] ............................................. H04Q 7/20
(52) U.S. Cl. ................................. 455/436; 455/432.1
(58) Field of Search .............................. 455/436, 432.1

(56) References Cited

U.S. PATENT DOCUMENTS

| | | | |
|---|---|---|---|
| 4,829,554 A | * 5/1989 | Barnes et al. | ............ 455/432.1 |
| 5,590,172 A | 12/1996 | Lodwig et al. | |
| 5,909,487 A | 6/1999 | Mainker | |
| 5,940,758 A | 8/1999 | Chavez, Jr. et al. | |
| 6,009,326 A | * 12/1999 | Roder et al. | ................ 455/436 |
| 6,263,203 B1 | 7/2001 | Jahn | |
| 6,501,952 B1 | 12/2002 | Foster et al. | |
| 2001/0012335 A1 | 8/2001 | Kaufman et al. | |
| 2003/0003915 A1 | 1/2003 | Foster et al. | |
| 2003/0003916 A1 | 1/2003 | Foster et al. | |

* cited by examiner

Primary Examiner—William Cumming

(57) ABSTRACT

An apparatus, method and system are provided for hand-off of a communication session from a serving base station to a target base station. The preferred system includes a switch coupled to the serving base station and to the target base station. Respective first and second terminals at the serving and target base station share the same directory number, with the first terminal of the serving base station providing the communication session with the mobile unit. For a hand-off, the target base station transmits a request designating the shared directory number to the switch. Upon reception of the request, the switch bridges the target base station, through a bridged call path, into the communication session, through a second terminal of the target base station having the shared directory number, to form a three-way communication session. The mobile unit may then communicate with the target base station for continuation of the communication session through the bridged call path, and the serving base station is released from the three-way communication session.

27 Claims, 5 Drawing Sheets

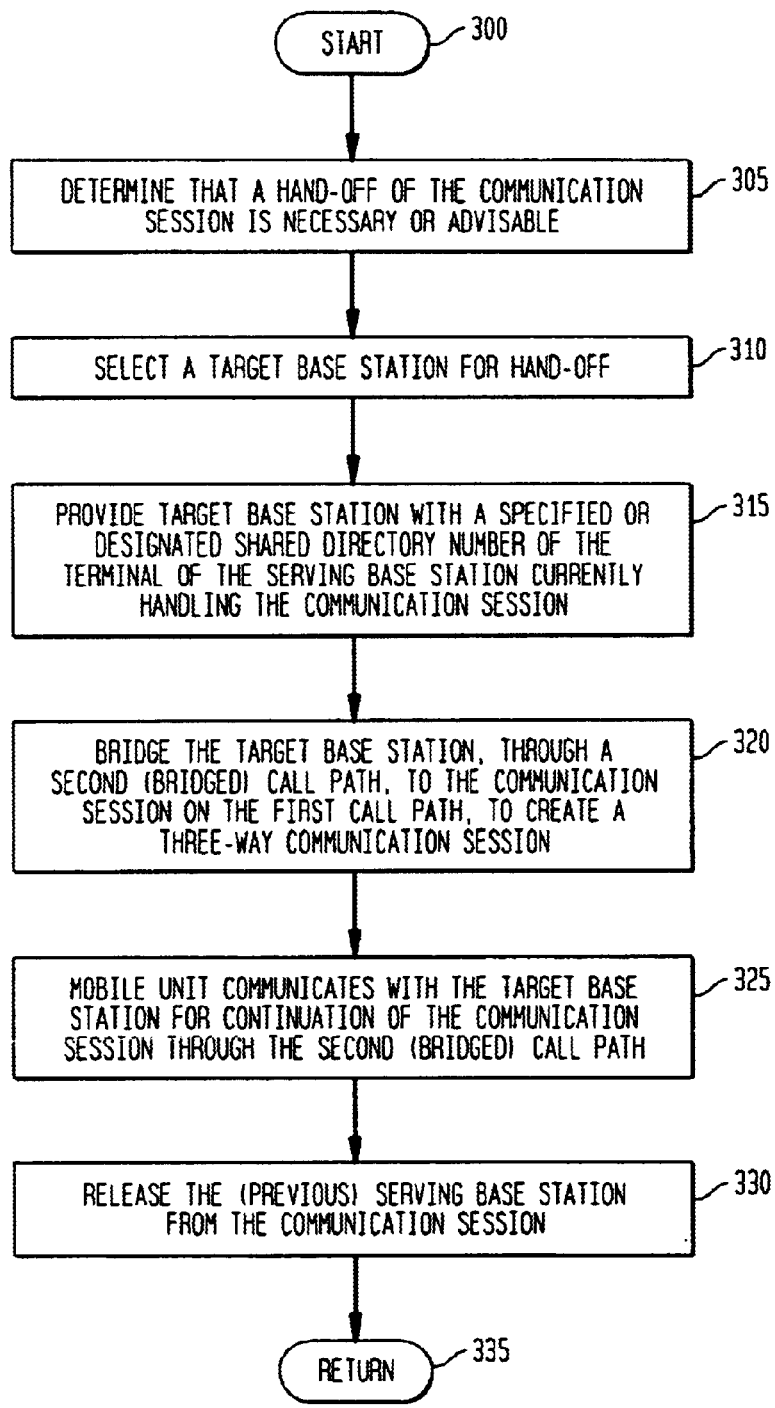

APPARATUS, METHOD AND SYSTEM FOR MOBILE WIRELESS COMMUNICATION HAND-OFF UTILIZING SHARED DIRECTORY NUMBERS

FIELD OF THE INVENTION

The present invention relates, in general, to wireless communication systems, and more particularly, to an apparatus, method and system for mobile wireless communication hand-off utilizing shared directory numbers.

BACKGROUND OF THE INVENTION

Mobile wireless communication systems typically employ many base stations (such as cell sites) to provide wireless communication throughout a given geographic region. As a mobile unit (or, equivalently, mobile station) may traverse the geographic region, the communication to and from the mobile unit may occur through one or more of these base stations. To maintain an ongoing communication session during such transitions between base stations, various hand-off methods have evolved to transfer the wireless communication with the mobile unit from one base station to another base station, while maintaining such an ongoing call or session.

In the prior art, for some of the various methods utilized during such hand-offs, the communication session may suffer from some degree of interruption, which may be noticeable to the consumer of wireless communication services. As a consequence, a need remains to provide for comparatively seamless hand-offs, which do not interrupt ongoing communication sessions and which are imperceptible to the consumer.

In addition, while other prior art systems may provide comparatively seamless hand-offs, such hand-offs typically utilize considerable network resources. In an Autoplex® system, for example, in addition to switches and base stations, another network entity referred to as an Executive Call Processor ("ECP") selects a server at the new cell site, while another network entity referred to as a Call Processing Database Node ("CDN") transmits various data link messages to the current and new cell sites, adding an additional path to the existing call, directing the new cell site to activate a wireless voice link, and directing the current (serving) cell site to direct the mobile to retune to the new wireless voice link at the new cell site.

As a consequence, a need remains for a wireless communication system to provide comparatively seamless and imperceptible hand-offs. In addition, such a wireless communication system should be reasonably efficient and capable of cost-effective implementation, eliminating or minimizing the use of additional network resources.

SUMMARY OF THE INVENTION

The wireless communication system of the present invention provides virtually seamless and imperceptible hand-offs of communication sessions of mobile units. The various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

In accordance with the present invention, an apparatus, method and system are provided for hand-off of a communication session utilizing shared directory numbers, in which the communication session of a mobile unit is transferred from a serving base station to a target base station. The preferred system includes a switch coupled to a serving base station and a target base station. Typically, each of the various base stations include a plurality of terminals which handle and process the communication sessions with mobile units and, in general, one or more terminals are assigned directory numbers ("DNs"). In accordance with the present invention, such DNs are shared by terminals in both the serving and target base stations.

When a hand-off of the communication session is indicated, the serving base station transmits a message, to the target base station, designating the shared directory number of the (first) terminal within the serving base station which is currently handling the communication session to be handed-off. The target base station then transmits a request or other message to the switch to join or bridge into the communication session at the specified or designated shared directory number. The switch then creates a bridged call path from the target base station (using a (second) terminal within the target base station having the same (i.e., shared) designated DN (of the first terminal within the serving base station), to the communication session of the first terminal within serving base station, to form a (reverse) three-way communication session among the mobile unit (via the serving base station), the target base station, and the switch. The mobile unit is then directed to communicate with the target base station for continuation of the communication session through the bridged call path, and the switch releases the serving base station from the three-way communication session.

As a consequence, the communication session of the mobile unit has been handed off, seamlessly and without interruption, from the serving base station to the target base station. Such a hand-off has also occurred utilizing minimal network resources, the switch and the base stations, without involvement of other intelligent or supervisory network elements.

The bridged call path from the target base station to the switch is established through the transmission of various messages between the target base station and the switch. The switch is correspondingly configured to acknowledge and connect the bridged call path to the communication session upon receipt of these various messages. In the various embodiments, depending upon the ISDN configuration, such as custom or national, the target base station is configured to transmit a "RECONNECT" or "RETRIEVE" message, with the switch configured to transmit corresponding acknowledgements and other messages.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 5 is a flow diagram illustrating a method embodiment in accordance with the present invention.

DETAILED DESCRIPTION OF THE INVENTION

Figure 1:
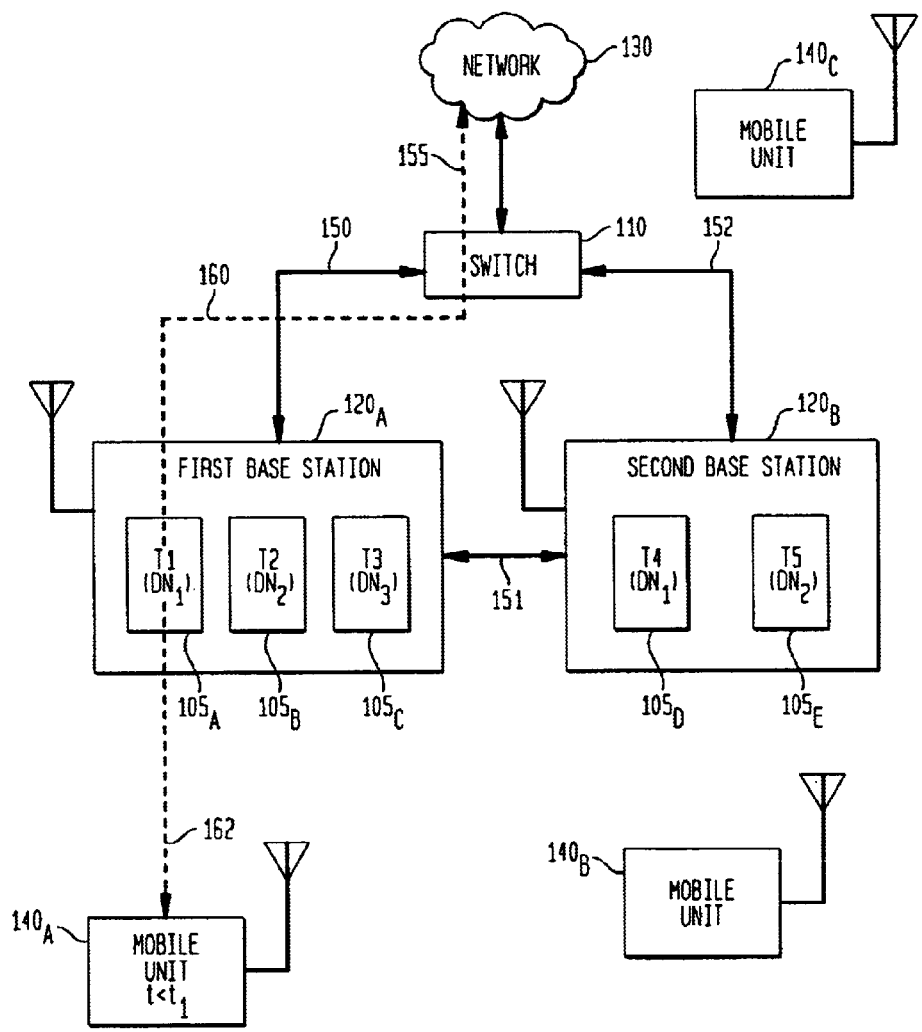
FIG. 1 is a block diagram illustrating a system embodiment, with a first communication path illustrated from a first base station to a mobile unit prior to a hand-off, in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a wireless communication system to provide comparatively seamless and imperceptible hand-offs, which is reasonably efficient and capable of cost-effective implementation, and which eliminates or minimizes the use of additional network resources such as ECPs and CDNs. In accordance with the present invention, a system, apparatus and method are illustrated which provide such advantages, namely, providing relatively seamless and imperceptible wireless hand-offs while utilizing minimal network resources (namely, utilizing existing switches and base stations configured in accordance with the invention), while simultaneously eliminating the prior art utilization of other network elements such as ECPs and CDNs.

FIG. 1 is a block diagram illustrating such a system embodiment 100 in accordance with the present invention. As illustrated in FIG. 1, the system 100 includes a switch 110 and one or more base stations (equivalently, cell sites) 120, such as first base station $120_A$ and second base station $120_B$. Each of the various base stations include a plurality of terminals $105_A$, $105_B$ ... $105_n$ which handle and process the communication sessions with mobile units 140. In general, one or more terminals are assigned directory numbers, some of which are shared by two or more terminals. In accordance with the present invention, these DNs are shared by terminals across base stations, not just within a base station. The capability for two or more terminals to share a directory number is a feature of Integrated Services Digital Network ("ISDN") communication systems.

The switch 110 is preferably a telecommunication switch such as a 5 ESS® switch or a 7RE switch manufactured by Lucent Technologies, Inc., which has been configured to operate in accordance with the present invention, as discussed in greater detail below. The switch 110 is coupled to a network 130, for additional call routing. The switch 110 may also be included within a mobile switching center, and may also be coupled to other intelligent network devices (not illustrated). The base stations 120 include wireless transceivers, for wireless communication with the various mobile units 140, such as cellular or other wireless telephones, wireless modems, or other mobile stations or wireless communication devices. The switch 110 and base stations 120 are coupled to each other utilizing signaling and/or trunking lines 150, 151 and 152, such as ISDN lines, as known in the art. In the preferred embodiment, the switch 110 is connected to the various base stations 120 utilizing ISDN lines 150 and 152.

As any mobile unit 140 traverses a geographic region and becomes farther away from any given base station 120 with which it has been in communication, the signal or power levels of such wireless communication to and from the mobile unit 140 typically drop below a preferred threshold or range. Under these circumstances, it is preferable for the given base station 120 to hand-off the communication to another base station 120 having higher signal strength to and from the given mobile unit 140. Continuing to refer to FIG. 1, for example, the mobile unit $140_A$ (at a time $t<t_1$) is currently served by first base station $120_A$, illustrated as communication or call paths (or legs) 162 (wireless) and 160 (wireline), with the portion of the communication session between the switch 110 and the network 130 separately illustrated as call path or leg 155. In these circumstances, the first base station $120_A$ is generally referred to as a serving base station or serving cell site. As the mobile unit $140_A$ travels toward the vicinity of base station $120^B$, such as toward mobile unit $140_C$, it may become necessary or preferable for the first, serving base station $120_A$ to hand-off the communication of mobile unit $140_A$ to the second base station $120_B$. In these circumstances, the second base station $120_B$ is generally referred to as a target base station or target cell site. Such a hand-off, in accordance with the present invention, is illustrated below with respect to FIG. 2.

Figure 2:
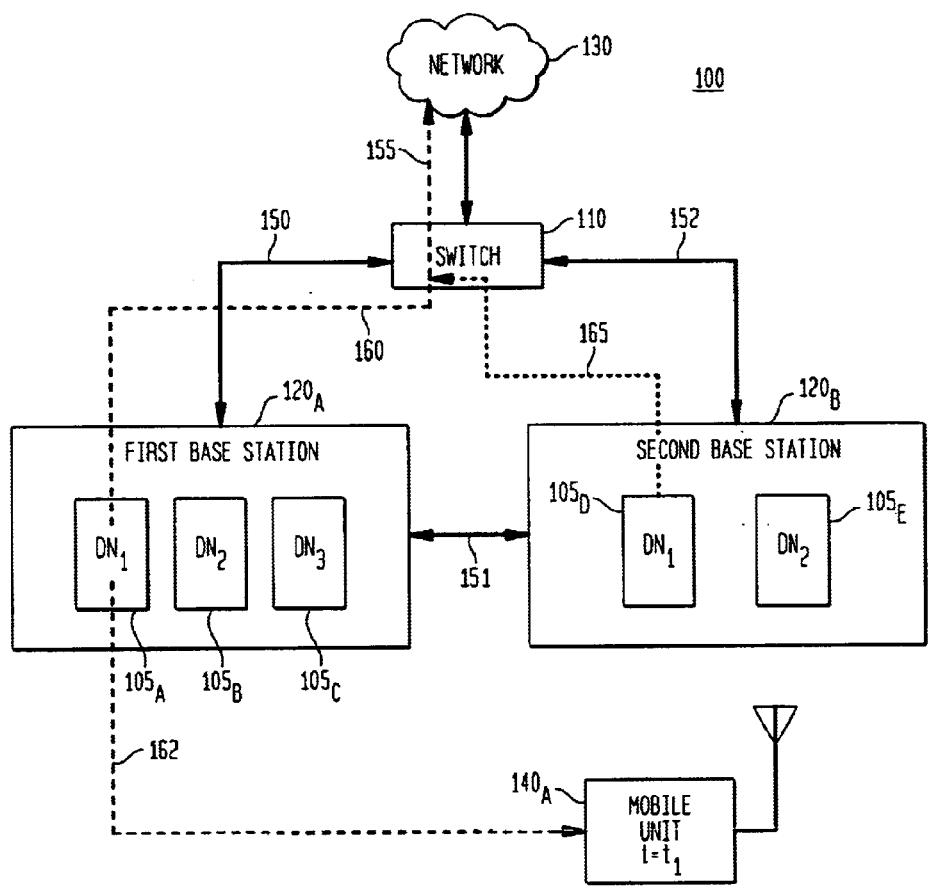
FIG. 2 is a block diagram illustrating a system embodiment, with the first communication path illustrated from the first base station to the mobile unit and a second communication path illustrated during a hand-off, in accordance with the present invention.

FIG. 2 is a block diagram illustrating a system 100 embodiment, with the first communication path (legs 160 and 162) illustrated from the switch 110 and first base station $120_A$ to the mobile unit and a second communication path 165 illustrated during a hand-off, in accordance with the present invention. To accomplish such a hand-off in accordance with the present invention, and as explained in greater detail below, the serving base station $120_A$ transmits a message to the target base station $120_B$ containing or including a directory number ($DN_1$) of the terminal $105_A$ that is serving the mobile unit $140_A$ through the first communication path (call paths 160 and 162). The target base station $120_B$ then transmits a request to the switch 110, such as a reconnect message or a retrieve message, containing a reference to the same, shared directory number $DN_1$. The switch then generates a second call path 165, over line 152, using the shared $DN_1$, to one of the terminals ($105_D$) of the second base station $120_B$ which has the same, assigned or shared directory number, and "bridges" the second call path 165 into the communication session of the first call path 160 to the terminal $105_A$, forming a three-way call. As terminals at the serving base station and the target base station share the directory number, the bridging of the two paths 160 and 165 by the switch is analogous to a subscriber picking up a second telephone extension for an ongoing call in a residential telecommunication service model.

As discussed in greater detail below, this is accomplished through transmission of various messages, the assignment of shared directory numbers to the terminals of the base stations 120, and configuring the switch 110 to recognize particular messages as indicative of a request to join an existing communication session at a specific, shared DN. The hand-off then proceeds as illustrated below with reference to FIG. 3.

Figure 3:
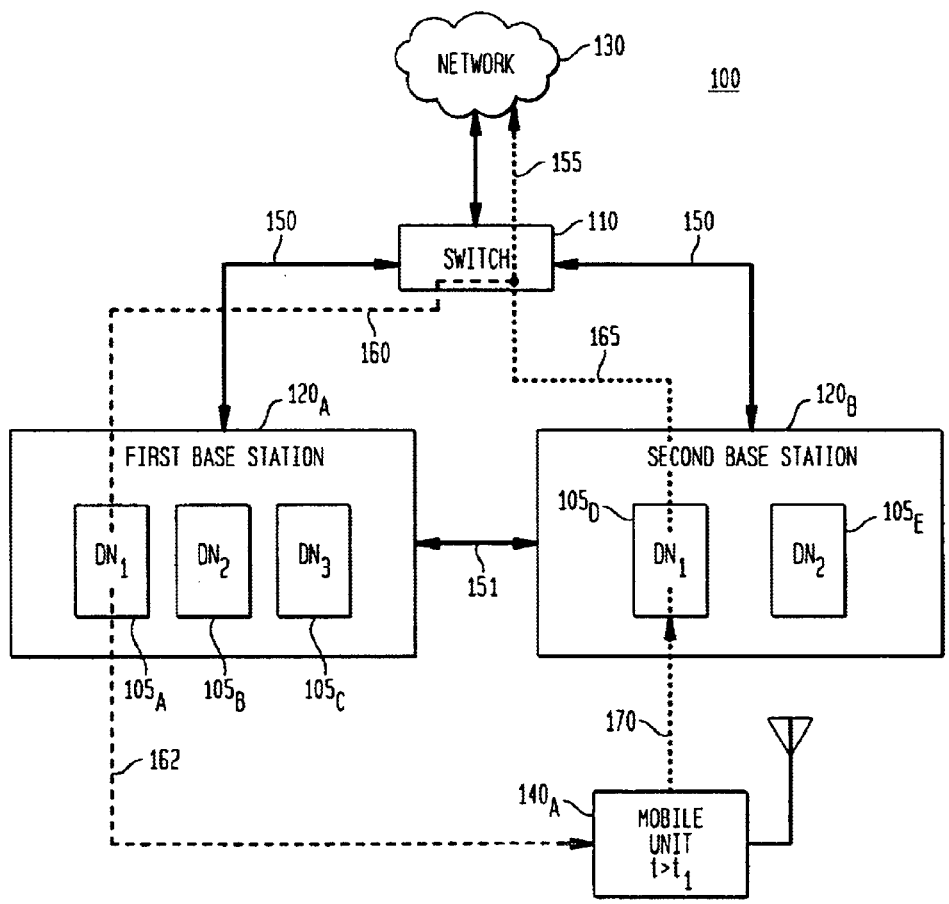
FIG. 3 is a block diagram illustrating a system embodiment, with the second communication path illustrated during completion of a hand-off and the commencement of a tear down of the first communication path, in accordance with the present invention.

FIG. 3 is a block diagram illustrating a system 100 embodiment during completion of a hand-off from the serving base station $120_A$ to the target base station $120_B$. When call path 165 (to and from the terminal $105_D$ of the target base station $120_B$) has been bridged into the first call path 160 at the switch 110, in accordance with the present invention, the mobile unit $140_A$ determines or is instructed (generally by the serving base station $120_A$) to tune to a specified channel of or otherwise set up a communication path to the target base station $120_B$, illustrated as call path 170, for continuing the same communication session via the bridged call path, i.e., through call path 165, which is a part or portion of the three-way communication session. The hand-off of the communication session from the serving base station $120_A$ to the target base station $120_B$ is then complete, and the communication path legs 162 and 160 may be torn down, with the communication session along call path legs 170 and 165 continuing uninterrupted, as illustrated in FIG. 3.

As may be apparent from the above discussion, the hand-off of the communication session, from the serving base station $120_A$ to the target base station $120_B$ using a shared directory number, occurs seamlessly and without interruption. In addition, such a hand-off is accomplished without the need for additional network resources.

Another significant distinction of the present invention is that the target base station originates the actual hand-off of the communication session. A marked departure from the prior art, the bridged call path is not initiated by the switch 110, by the serving base station, or by any other network entity.

Figure 4:
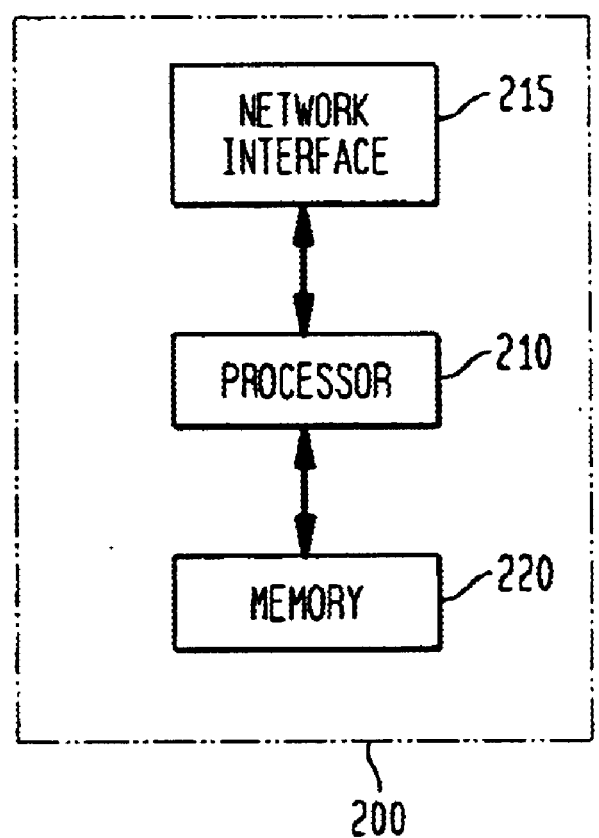
FIG. 4 is a block diagram illustrating an apparatus embodiment in accordance with the present invention.

FIG. 4 is a block diagram illustrating an apparatus embodiment 200 in accordance with the present invention. As discussed in greater detail below, such an apparatus 200 may be included within, or distributed between, a switch 110 and/or a base station 120 of a system 100. (Numerous other variations and equivalent embodiments will be readily apparent and are also within the scope of the present invention.) The apparatus 200 includes a processor 210, a network interface 215, and a memory 220. The network interface 215 is utilized for voice communication and for transmission and reception of various messages, requests and responses discussed below, such as various messages utilized in National or Custom ISDN implementations. The memory 220 may be a magnetic hard drive, an optical storage device, a memory circuit, or any other type of data storage apparatus. The memory 220 is used to store information pertaining to call placement, call set up, routing information, shared directory numbers, and program instructions or configurations, as discussed in greater detail below.

Continuing to refer to FIG. 4, the processor 210 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1–3, and also discussed in detail below with reference to FIG. 5, with associated memory, such as microprocessor memory or additional RAM, DRAM, SRAM, MRAM, ROM, EPROM or $E_2$PROM. The processor 210 with its associated memory may be configured (via programming, interconnect or hard-wiring) to perform the methodology of the invention, as discussed above with reference to FIGS. 1–3 and as discussed below with reference to FIG. 5. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 210 is implemented in its entirety as a microprocessor, which is programmed to implement the methodology of the invention. As mentioned above, such an apparatus 200 may be included within, or distributed between, a switch 110 and/or a base station 120.

FIG. 5 is a flow diagram illustrating a method embodiment in accordance with the present invention. Beginning with start step 300, the method determines that a hand-off is necessary or preferable, step 305. This may be accomplished through various methods known in the art, from various requests transmitted by the serving base stations, such as base station $120_A$, with responses from the potential target base stations, such as base station $120_B$, or by determinations made by the particular mobile unit 140. Next, a target base station is selected for a hand-off, also as known in the art, such as base station $120_B$, step 310.

The serving base station $120_A$ then transmits, to the selected target base station $120_B$, one or more information messages which include the shared directory number associated with the terminal of the serving base station $120_A$ that is carrying or handling the communication session to be handed off, step 315. Next, in step 320, the target base station $120_B$ (via terminal $105_D$ having the shared DN) is bridged, through a second, bridged call path, to the communication session on the first call path, to create a three-way communication session.

In the preferred embodiment, step 320 is accomplished utilizing various ISDN messages. The target base station $120_B$ commences the hand-off by transmitting to the switch 110 either a "RECONNECT" message (Custom ISDN implementation) or a "RETRIEVE" message (National ISDN implementation), with both message types including a call reference to the shared directory number (e.g., $DN_1$), establishing call path 165. RECONNECT and RETRIEVE messages are compatible with ISDN Q.931 standards and, given the state of the call in progress, are interpreted by the switch equivalently as a request to "bridge" into the communication session of the terminal ($105_A$) of serving base station $120_B$ having the shared directory number. (It should be noted that for other call states, such as held calls, these ISDN messages may be interpreted to retrieve these calls, i.e., to take the call off hold.) The switch 110 transmits an acknowledgement to the RECONNECT (or RETRIEVE) message to the target base station, also with both message types including a call reference to the shared directory number (e.g., $DN_1$). For National ISDN implementations, the switch follows the RETRIEVE acknowledgement with a "NOTIFY" message transmitted to the serving base station. For Custom ISDN implementations, the switch follows the RECONNECT acknowledgement with an information (INFO) message transmitted to the serving base station. A three-way communication session is thereby established among the mobile unit $140_A$ (via serving base station $120_A$) and the target base station $120_B$ (also with the other party to the communication session via the network 130).

Following the creation of the three-way session, the mobile unit $140_A$ tunes to a specified channel or otherwise sets up a communication path to the target base station $120_B$, illustrated in FIG. 3 as call path 170, for continuing the communication session via the bridged call path 165, step 325. In the preferred embodiment, a variety of methods may be utilized to provide for such establishment of call path 170. For example, the mobile unit $140_A$ may be directed by the serving base station $120_A$ to tune to a channel of the target base station $120_B$; or the mobile unit $140_A$ may initiate such tuning to the target base station. As the various target and serving base stations have independent signaling paths (illustrated generally as signaling and/or trunking line 151 in FIGS. 1–3), the target base station then generally informs or notifies the serving base station that the serving base station may now drop (tear down) its portion of the three-way call (the portion of call path 160 between the first base station $120_A$ and switch 110). As a consequence, in step 330, the previously serving base station $120_A$ disconnects from the three-way call, and the switch 110 releases the call to this previously serving base station, thereby tearing down the communication path 160 (from the switch 110 to the first base station $120_A$), with the communication session continuing uninterrupted through links or call path legs 155, 165, and 170 as illustrated in FIG. 3. Step 330 is preferably accomplished in a Custom ISDN implementation by a DISCONNECT message transmitted from the previously serving base station $120_A$ to the switch 110, followed by an "ASSOCIATED" message from the switch 110, both having a call reference to the shared DN, thereby releasing the call. In a National ISDN implementation the DISCONNECT message from the serving base station $120_A$ is followed by a RELEASE message from the switch, also having a call reference to the shared DN. Following the release in step 330, the method may end, return step 335.

It should be noted that the procedures outlined above could be used for subsequent hand-offs between any serving and target base station that include terminals having a shared directory number. This process may be continued for as many hand-offs as may be necessary for the given communication session of the mobile unit.

Numerous advantages of the present invention may be apparent from the above discussion. First, as illustrated above, the wireless communication system of the present invention provides virtually seamless and imperceptible hand-offs of communication sessions of mobile units. Second, the various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for hand-off of a communication session in a mobile wireless communication system, utilizing a shared directory number associated with a first terminal of a serving base station providing the communication session with the mobile unit, in which the communication session is transferred from the serving base station to a target base station, the method comprising:

(a) providing the target base station with the shared directory number;

(b) bridging the target base station through a bridged call path into the communication session, through a second terminal of the target base station having the shared directory number, to form a three-way communication session; and (c) when the mobile unit has established communication with the target base station for continuation of the communication session through the bridged call path, releasing the serving base station from the three-way communication session.

2. The method of claim 1, wherein step (a) further comprises:

transmitting the shared directory number from the serving base station to the target base station.

3. The method of claim 1, wherein step (b) further comprises:

transmitting from the target base station to the switch a message to bridge into the communication session, the message including a call reference to the shared directory number.

4. The method of claim 3 wherein the message is a reconnect message.

5. The method of claim 3 wherein the message is a retrieve message.

6. The method of claim 1, wherein step (c) further comprises:

transmitting a disconnect message from the serving base station to the switch, the disconnect message including a call reference to the shared directory number; and transmitting an associated message from the switch to the serving base station, the associated message including a call reference to the shared directory number.

7. The method of claim 1, wherein step (c) further comprises:

transmitting a disconnect message from the serving base station to the switch, the disconnect message including a call reference, to the shared directory number; and transmitting a release message from the switch to the serving base station, the release message including a call reference to the shared directory number.

8. A system for hand-off of a communication session in a mobile wireless communication system, utilizing a shared directory number associated with a first terminal of a serving base station providing the communication session with the mobile unit, in which the communication session is transferred from the serving base station to a target base station, the system comprising:

a plurality of base stations, the plurality of base stations including the serving base station and the target base station, wherein the target base station is configured to transmit a bridge request designating the shared directory number;

a switch coupled to the serving base station and to the target base station, wherein the switch is configured, upon reception of the bridge request from the target base station, to bridge the target base station through a bridged call path into the communication session, through a second terminal of the target base station having the shared directory number, to form a three-way communication session;

wherein upon the communication of the mobile unit with the target base station for continuation of the communication session through the bridged call path, the serving base station is released from the three-way communication session.

9. The system of claim 8, wherein the serving base station is configured to provide to the target base station information designating the shared directory number.

10. The system of claim 8, wherein the bridge request is a reconnect message, the reconnect message including a call reference to the shared directory number.

11. The system of claim 8, wherein the bridge request is a retrieve message, the retrieve message including a call reference to the shared directory number.

12. The system of claim 8, wherein, when the mobile unit is in communication with the target base station, the serving base station is configured to transmit a disconnect message to the switch, the disconnect message including a call reference to the shared directory number.

13. The system of claim 12, wherein following reception of the disconnect message, the switch is configured to transmit an associated message to the serving base station, the associated message including a call reference to the shared directory number.

14. The system of claim 12, wherein following reception of the disconnect message, the switch is configured to transmit a release message to the serving base station, the release message including a call reference to the shared directory number.

15. An apparatus for hand-off of a communication session in a mobile wireless communication system, utilizing a shared directory number associated with a first terminal of a serving base station providing the communication session with the mobile unit, in which the communication session is transferred from the serving base station to a target base station, the apparatus comprising:
   a network interface for communication with a switch and with the mobile unit;
   a memory storing instructions, said instructions including hand-off instructions; and
   a processor coupled to the memory and to the network interface, wherein the processor is configured to generate a request to the switch, the request designating the shared directory number, to bridge via the network interface into the communication session through a bridged call path to form a three-way communication session; and the processor further configured to connect a received communication from the mobile unit to the bridged call path for continuation of the communication session through the bridged call path.

16. The apparatus of claim 15, wherein the request is a reconnect message, the reconnect message including a call reference to the shared directory number.

17. The apparatus of claim 15, wherein the request is a retrieve message, the retrieve message including a call reference to the shared directory number.

18. The apparatus of claim 15, wherein the apparatus is included within the target base station.

19. An apparatus for hand-off of a communication session in a mobile wireless communication system, utilizing a shared directory number associated with a first terminal of a serving base station providing the communication session with the mobile unit, in which the communication session is transferred from the serving base station to a target base station, the apparatus comprising:
   a network interface for communication with the target base station and the serving base station;
   a memory storing instructions, said instructions including hand-off instructions; and
   a processor coupled to the memory and to the network interface, wherein the processor is configured, upon reception through the network interface of a request from the target base station, the request designating the shared directory number, to form a bridged call path to the target base station at the shared directory number and to combine the bridged call path into the communication session on the first terminal to form a three-way communication session; and wherein the processor is further configured to release the serving base station at the shared directory number from the three-way communication session for continuation of the communication session through the bridged call path following establishment of communication between the mobile unit and the target base station.

20. The apparatus of claim 19, wherein the request is a reconnect message, the reconnect message including a call reference to the shared directory number.

21. The apparatus of claim 20, wherein the processor is configured, upon receipt through the network interface of the reconnect message, to transmit a reconnect acknowledge message to the target base station.

22. The apparatus of claim 19, wherein the request is a retrieve message, the retrieve message including a call reference to the shared directory number.

23. The apparatus of claim 22, wherein the processor is configured, upon receipt through the network interface of the retrieve message, to transmit a retrieve message acknowledge message to the target base station.

24. The apparatus of claim 19, wherein the processor is configured, upon receipt through the network interface of a disconnect message from the serving base station, to transmit an associated message to the serving base station.

25. The apparatus of claim 19, wherein the processor is configured, upon receipt through the network interface of a disconnect message from the serving base station, to transmit a release message to the serving base station.

26. The apparatus of claim 19, wherein the apparatus is included within a switch.

27. A system for hand-off of a communication session in a mobile wireless communication system, utilizing a shared directory number associated with a first terminal of a serving base station providing the communication session with the mobile unit, in which the communication session is transferred from the serving base station to a target base station, the system comprising:
   a plurality of base stations, the plurality of base stations including the serving base station and the target base station, wherein the serving base station is configured to provide to the target base station information designating the shared directory number, and wherein the target base station is configured to transmit a reconnect message or a retrieve message, both the reconnect message and the retrieve message including a call reference to the shared directory number;
   a switch coupled to the serving base station and to the target base station, wherein the switch is configured, upon reception of the reconnect message or the retrieve message from the target base station, to bridge the target base station through a bridged call path into the communication session, through a second terminal of the target base station having the shared directory number, to form a three-way communication session;
   wherein upon the communication of the mobile unit with the target base station for continuation of the communication session through the bridged call path, the serving base station is configured to transmit a disconnect message to the switch, the disconnect message including a call reference to the shared directory number, and the switch is configured to transmit an associated message or a release message to the serving base station, both the associated message and release message including a call reference to the shared directory number, whereby the serving base station is released from the three-way communication session.

* * * * *